United States Patent
Bruun

[11] Patent Number: 6,152,280
[45] Date of Patent: Nov. 28, 2000

[54] ARTICULATED CONVEYOR

[75] Inventor: Brian Bruun, Hjortshøj, Denmark

[73] Assignee: Crisplant a/s, Denmark

[21] Appl. No.: 09/219,609

[22] Filed: Dec. 23, 1998

[30] Foreign Application Priority Data

Dec. 23, 1997 [DK] Denmark .......................... 1997 01532
Jul. 28, 1998 [DK] Denmark .......................... 1998 00987

[51] Int. Cl.[7] .................................................. B25G 47/10
[52] U.S. Cl. ............................. 198/370.04; 198/803.14; 198/822
[58] Field of Search .................. 198/370.04, 803.14, 198/713, 714, 852, 822

[56] References Cited

U.S. PATENT DOCUMENTS

| | | | |
|---|---|---|---|
| 2,594,342 | 4/1952 | Pettyjohn | 198/822 |
| 3,231,066 | 1/1966 | Harrison et al. | |
| 3,395,785 | 8/1968 | Rysti . | |
| 4,031,998 | 6/1977 | Suzuki et al. | |
| 4,461,378 | 7/1984 | Roth . | |
| 5,054,601 | 10/1991 | Sjogren et al. | 198/370.04 |
| 5,137,144 | 8/1992 | Uehara | 198/822 |
| 5,407,061 | 4/1995 | Okada et al. | |
| 5,427,223 | 6/1995 | van den Goor . | |
| 5,429,227 | 7/1995 | Krossmann et al. | |
| 5,435,429 | 7/1995 | van den Goor . | |
| 5,489,017 | 2/1996 | Bonnet . | |
| 5,667,054 | 9/1997 | van den Goor . | |

FOREIGN PATENT DOCUMENTS

| | | | |
|---|---|---|---|
| 520867 | 7/1953 | Belgium | 198/822 |
| 555309 | 3/1957 | Belgium | 198/822 |
| 10056912 | 8/1982 | European Pat. Off. . | |
| 10753474 | 1/1997 | European Pat. Off. . | |
| 10782966 | 7/1997 | European Pat. Off. . | |
| 1170989 | 1/1959 | France | 198/822 |
| 384764 | 11/1923 | Germany | 198/822 |
| 1039925 | 9/1958 | Germany | 198/822 |
| 404148722 | 11/1923 | Japan | 198/370.04 |
| 402086509 | 3/1990 | Japan | 198/370.04 |
| 403095009 | 4/1991 | Japan | 198/822 |
| 9713712 | 4/1997 | WIPO . | |

*Primary Examiner*—Robert P. Olszewski
*Assistant Examiner*—Steven B. McAllister
*Attorney, Agent, or Firm*—Birch, Stewart, Kolasch & Birch, LLP

[57] ABSTRACT

The present invention provides an articulated conveyor for transporting articles on guide tracks having sections that curves in the horizontal and/or vertical plane. The conveyor comprises a plurality of interconnected uniform conveyor units each including a tiltably mounted article-supporting member.

The units are mutually pivotally connected and each has a first covering sheet member pivotally mounted at one end of the supporting member and engaging with a guiding member of the adjacent conveyor unit so as to cover a possible gap between the second end of the supporting member and the adjacent guiding member in all mutual pivot positions of neighboring conveyor unit, the first covering sheet member being supported by supporting means mounted on the supporting member.

24 Claims, 8 Drawing Sheets

ARTICULATED CONVEYOR

TECHNICAL FIELD

The present invention relates to a conveyor system for transporting articles and comprising separate surfaces for supporting the articles. At least some of the surfaces may be tiltable so as to discharge the articles carried on the surfaces. In particular, the invention relates to a conveyor system, wherein the supporting surfaces are constructed so as to cover a possible gap between adjacent surfaces.

BACKGROUND ART

Conveyor systems comprising separate surfaces for supporting articles are commonly known from the prior art and a number of systems have been described.

A conveyor system comprising a chain of trucks on which primary supporting surfaces are tiltably mounted is described in U.S. Pat. No. 3,231,066. The trucks are interconnected with plates on each of which two secondary supporting surfaces are pivotally mounted and each secondary supporting surface overlaps one primary surface. The primary supporting surfaces are individually tiltable whereby the secondary surface at each end of the primary surface is also tilted so as to discharge an article that may be supported by the three surfaces in question.

Another conveyor system comprising a number of supporting platforms that fits closely to each other and where the platforms are tiltable is disclosed in EP 0 753 474 A1. The platforms are overlapping two and two, and the two overlapping platforms may pivot relatively to each other about a vertical axis. The supports connecting the platforms to the transport means of the conveyor are arranged in spaced-apart groups of two supports disposed near each other, whereby the platforms connected to the supports of a given group extend from the respective supports in a direction away from each other, and whereby the end of a platform connected to the support of the adjacent group is overlapped by the end of a platform connected to the support of the given group. Platforms connected to the support of one group are arranged pivotally about a common horizontal pivot pin and screens are extending downwards from the adjacent ends of the platforms connected to the supports of the same group.

SUMMARY OF THE INVENTION

It is a commonly known problem from conveyor systems comprising separate article-supporting surfaces that parts of the articles that are transported by the conveyor system may get wedged between the separate surfaces when the conveyor unit enters or leaves curved track sections, when the surfaces are tilted so as to discharge the articles, or when the surfaces are returned from the tilted to the horizontal position.

Furthermore, the actual surface area of the conveyor systems on which articles may be placed is considerably smaller that the area covered by the conveyor system, due to the distance between the separate surfaces necessary to allow the mutual movement between the surfaces when passing curved track sections and due to the risk that parts of the articles are wedged.

A number of the known devices adapted for overcoming the above-identified problems are comprising technically complicated solutions that are expensive to install and maintain and that are not applicable to existing conveyor systems. It is a further problem of some of the known devices that they prevent the supporting surfaces from being tilted when the conveyor unit passes curved track section or do not cover possible gaps in those situations.

It is an object of the present invention to provide a conveyor system that covers a possible gap that could be formed between adjacent parts in the supporting area when adjacent units of the conveyor system pivot relatively to each other during passage of track sections that are curved, so as to prevent parts of the articles that are transported by the conveyor system from getting wedged between adjacent parts of the conveyor system.

It is a further object of the invention that possible gaps are covered during all operations including tilting of the article-supporting surface and restoring of the article-supporting surfaces from the tilted to the normal position, both when the conveyor units pass straight as well as curved track sections.

It is a still further object of the invention to provide a conveyor system where the total area of the surfaces that support articles is increased due to a better utilization of the area that is covered by the conveyor system.

It is a still further object to provide a conveyor system that fulfills one or more of the above objects by a simple technical solution, preferably a solution that may be applied to existing conveyor units, especially to existing conveyor units that comprise means for tilting of article-supporting surfaces, so that existing frames or trucks of an existing conveyor system may be reused.

The present invention is intended to be used for a variety of applications, such as, e.g., for transport of luggage in airports.

Thus, the present invention provides an articulated conveyor for transporting articles and comprising

- a stationary guide track having curved track sections,
- a plurality of interconnected uniform conveyor units, which are mutually pivotally connected, each conveyor unit including a frame part and an article-supporting member tiltably mounted on the frame part, each conveyor unit having opposite first and second ends, so that the first end of each conveyor unit is positioned adjacent to the second end of a neighboring unit, and having a guiding member which extends transversely to the longitudinal direction of the track and being mounted at the first end of the conveyor unit, the second end of each unit being shaped so as to allow for necessary mutual pivotal movements when passing the curved track sections,
- a first covering sheet member being mounted at said second end of the supporting member and engaging with the guiding member at the first end of the adjacent conveyor unit so as to cover a possible gap between the second end of the supporting member and the adjacent guiding member in all mutual pivotal positions of neighboring conveyor unit, the first covering sheet member being supported by supporting means mounted on said supporting member, and
- means for moving the interconnected conveyor units along said track.

The means for moving the conveyor units along the tracks may comprise, e.g., linear motors, driving chains, stationary motors driving wheels that engage with parts of the conveyor units, drive units comprising electro motors positioned on at least some of the conveyor units, etc. The means are preferably arranged for moving the conveyor units along the guide track in such a direction that the second end of each conveyor unit is the leading end.

The supporting member is preferably tiltable in relation to the frame part about an axis extending in the longitudinal direction of the guide track so that the articles transported by the conveyor may be discharged in a direction substantially perpendicular to the longitudinal direction of the tracks by tilting of the supporting member.

The track sections may be curved in projection on a horizontal plane and the conveyor units may be mutually interconnected pivotally about a substantially vertical pivot axis positioned at the second end of each supporting member so as to allow for mutual pivotal movements between adjacent conveyor units when they enter or leave track sections that are curved in the horizontal plane.

The track sections may also be curved in projection on a vertical plane and the conveyor units may be mutually interconnected pivotally about a substantially horizontal pivot axis positioned at the second end of each supporting member so as to allow for mutual pivotal movements between adjacent conveyor units when they enter or leave track sections that are curved in the vertical plane.

A preferred way of mounting the first covering sheet member, if the conveyor is adapted for track sections that are curved in the horizontal plane, is to connect the first covering sheet member pivotally to the second end of the supporting member about the same substantially vertical pivot axis as the adjacent conveyor units pivot about.

It is important that a gap is not formed between the first covering member and the supporting member because parts of the transported articles could get wedged or get stuck in such a gap. In order to assist the first covering sheet member in being in abutting engagement with the lower side surface of the second end of the supporting member, supporting means may be mounted on the supporting member and be in abutting engagement with the lower side surface of the first covering sheet member. Preferably, the supporting means are resiliently biasing the first covering sheet member in an upward direction.

A possible formation of a gap between the first covering surface and the supporting member may be prevented by making a free end part of the article-supporting member from a resilient material and pressing it into engagement with the first covering sheet member by elastic forces. This method may either replace or be supplementary to letting the supporting means bias the first covering sheet member upwardly.

In a first preferred embodiment of the invention, the guiding member comprises a separating wall member which extends transversely to the longitudinal direction of the track and is mounted at the first end of the frame member of each conveyor unit, the first covering sheet member engaging with the separating wall member of the adjacent conveyor unit. It has been found to be advantageous to position a second covering sheet member at the first end of the supporting member and letting it engage with the guiding member at the first end of the adjacent conveyor unit so as to cover a possible gap between the second end of the supporting member and the adjacent guiding member in all mutual pivotal positions of neighboring conveyor units.

It has also been found to be an advantage to at least partly make the first and/or the second covering sheet member(s) from a flexible or resilient material. Furthermore, one or both of the first and second covering sheet members may have a bent free rim portion which is resiliently engaging with the adjacent side surface of the separating wall member so as to ensure that the covering sheet member engages with the separation wall member when the two members move relatively to each other.

The separating wall members extending above the article-supporting surface may constitute a problem in case articles get stuck at loading stations, discharging stations, or at another position along the path of the tracks, in which case the articles are not able to follow the movement of the conveyor units. Major damage may be caused on the articles that are transported and/or on the conveyor system if such a stuck article blocks the path of the separating wall members when the conveyor units are running and the separating wall members are rigid. Therefore, at least the part of the separating wall member extending above the upper surface of the supporting member is preferably made from a flexible material. It is also an advantage, especially when the separating wall member is made from a resilient material, that the moving means are adapted to move the interconnected conveyor units along the guide track in such a direction that the second end of each conveyor unit is the leading end. In this way, the bent rim of the first covering member acts as a ramp that assists a stuck article in moving over the separating wall member.

An alternative solution to the above described problem is that each separating wall member comprises a zone having a reduced breaking strength so as to secure that the wall member breaks in this zone without causing damage to other parts of the conveyor when the wall part is exposed to forces exceeding a predetermined safety limit.

According to a second and more preferred embodiment of the present invention, the guiding member comprises a slidable sheet member extending beyond said first end in the direction towards the second end of the article-supporting member of the adjacent conveyor unit, the slidable sheet member being mounted slidably in the longitudinal direction of the guide track and being resiliently biased towards said adjacent conveyor unit, the first covering sheet member engaging with the slidable sheet member of the adjacent conveyor unit, so as to cover a possible gap between the first end of the supporting member and the first covering sheet member of said adjacent conveyor unit in all mutual pivotal positions of neighboring conveyor units.

The first covering sheet member and the slidable sheet member are preferably at their mutually engaging ends equipped with screen parts extending transversely to the longitudinal direction of the guide track from said ends towards the guide track so as to prevent parts of conveyed articles from being wedged during mutual tilting movements of article-supporting members of adjacent conveyor units.

In order to reduce the noise from the conveyor system, reducing energy consumption of the system, and/or in order to diminish wear on the parts that are engaging each other, it is an advantage that the mutually engaging surface parts of the supporting member and the first covering sheet, respectively, and/or the mutually engaging surface parts of the covering sheet members and the separating wall members, respectively, and/or the mutually engaging surface parts of the slidable sheet members and the article-supporting members, respectively, are coated with a friction reducing and/or wear resistant material.

DETAILED DESCRIPTION OF FIGURES

Figure 1:
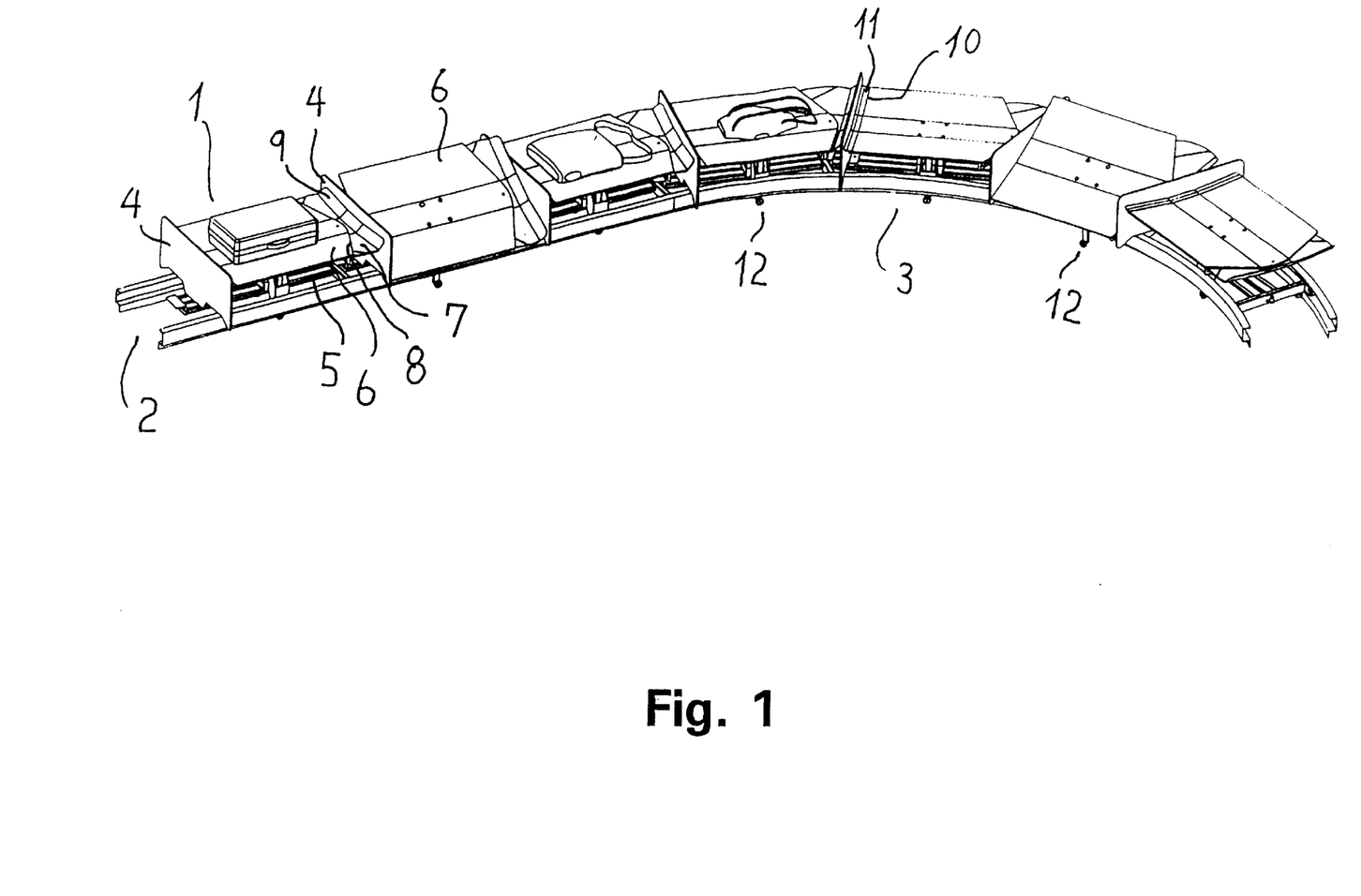
FIG. 1 shows an overview of the articulated conveyor passing tracks that are curved in the horizontal plane.

An articulated conveyor system according to a first embodiment of the invention is shown in FIGS. 1–9. An overview of the articulated conveyor system is shown in FIG. 1. A plurality of uniform interconnected conveyor units 1 are running on a stationary track 2 having sections 3 that are curved in the horizontal plane. A separating wall member 4 is positioned at a first end of the conveyor unit 1 and is mounted on a frame part 5 of the unit. Each conveyor unit 1 has an article-supporting surface 6 that is tiltably mounted on the frame part 5 of the conveyor unit 1 and a first covering sheet member 7 that is mounted at a second end of the conveyor unit 1 and engaging with the separating wall member 4 of the adjacent unit so as to cover a possible gap between the second end 8 of the supporting surface 6 and the separating wall member 4 of the adjacent conveyor unit 1. At least the part of the first covering sheet member 7 that is engaging with the separating wall member 4 is made from a flexible or resilient material and has a bent free rim 9 that is resiliently engaging with the adjacent separating wall member 4 so as to ensure that the first covering sheet member 7 engages with the wall member 4 over at least part of the extent in the transversal direction of the sheet member 7 during all operations and movements of the conveyor system, such as, e.g., tilting of a surface 6 when the conveyor unit 1 is running on the straight or on the curved track sections 3.

The article-supporting surface 6 has a first end 10 on which a flexible or resilient second covering sheet member 11 is mounted so as to cover a possible gap between the supporting surface 6 and the separating wall member 4 of the same conveyor unit 1. The second covering sheet 11 has also a bent free rim which is resiliently engaging with the adjacent separating wall member 4, similarly to the first covering sheet.

The second end 8 of the article-supporting surface 6 and the second end of the frame part 5 are shaped so as to allow the necessary mutual pivotal movements between adjacent conveyor units 1 when they pass the curved track section 3.

Furthermore, the conveyor system comprises means for loading articles onto the conveyor units at one or more loading stations positioned along the track 2 and means for tilting the article-supporting surfaces 6 at one or more selected positions along the track 2 so as to discharge the articles transported by the conveyor system at one or more discharging stations.

The article-supporting surfaces 6 may be tilted in a variety of different ways which are well known from the prior art. The method for tilting the surfaces used in the embodiment shown in the Figures, employs at least one wheel 12 connected to the tilting means of each conveyor unit 1. The wheel 12 is engaging a separate track of the conveyor system. In case the article on the supporting surface 6 is to be discharged, a discharging mechanism at the discharging stations can direct the wheel from the track in a direction upwards or downwards depending on to which side of the conveyor unit 1 the article is to be discharged.

The conveyor system also comprises a control unit adapted to control the loading of articles onto and discharge of articles from the conveyor system. The conveyor units 1 are labeled uniquely with an automatically readable identification mark, such as, e.g., a barcode label in order to identify the individual conveyor units 1. The conveyor system further comprises reading means for reading the identification marks at least at one position along the tracks 2 of the conveyor system, preferably at the loading stations and at the discharging stations.

Figure 2:
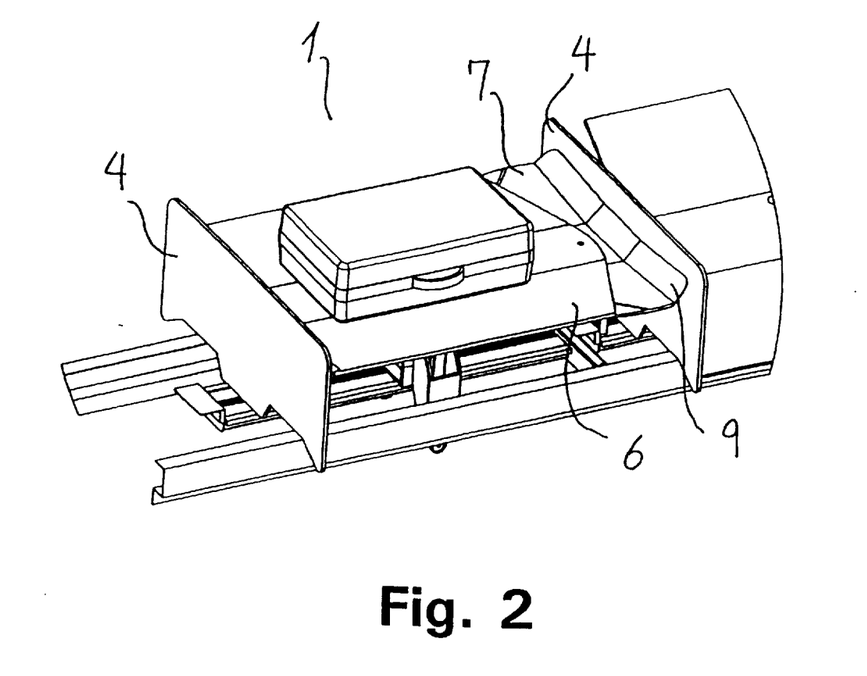
FIG. 2 shows details of a conveyor unit running on straight track sections.
Figure 3:
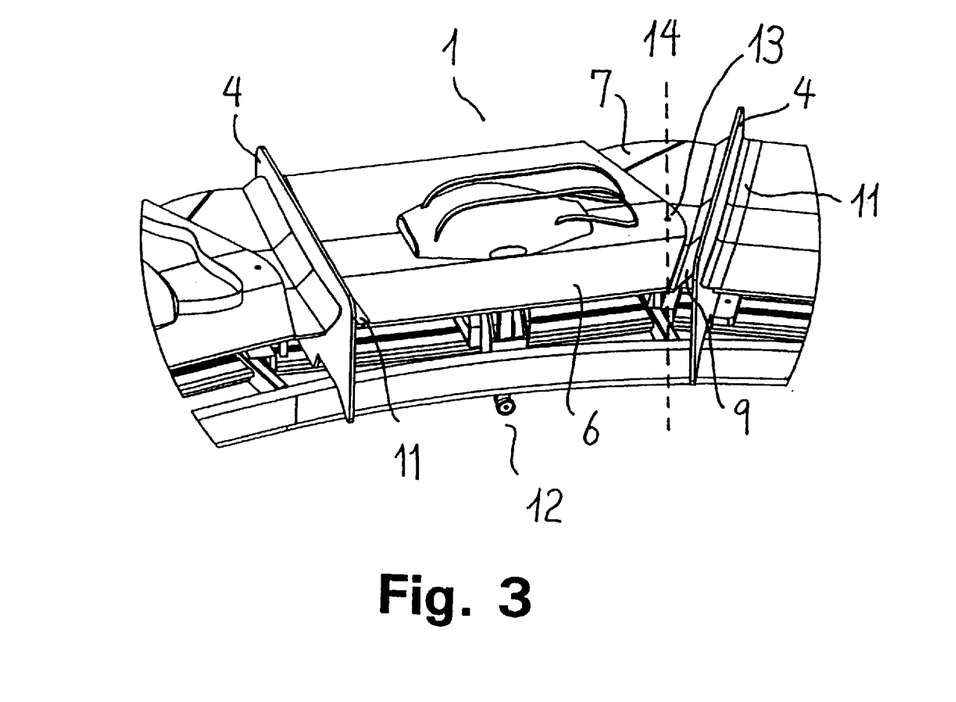
FIG. 3 shows details of a conveyor unit passing a curved track section.

The effect of the first covering sheet member 7 when the conveyor unit 1 is running on straight and on curved track sections 3 is shown on respectively FIG. 2 and FIG. 3. The first covering sheet member 7 is connected pivotally to the article-supporting member 6 with a pivot pin 13 to enable the sheet member 7 to pivot about substantially the same vertical axis 14 as the adjacent conveyor units pivot about relatively to each other on the curved track sections 3. The bent rim 9 of the first covering sheet member 7, which is resiliently engaging the separating wall member 4 of the adjacent conveyor unit 1, engages the wall member 4 on both straight and curved track sections 3 as can be seen from FIGS. 2 and 3. The engagement has the effect that the first covering sheet member 7 pivots about the axis 14 when the unit 1 enters or leaves the curved track sections 3 so that the first covering sheet member 7 together with the article-supporting member 6 and the second covering sheet member 11 form a substantially closed surface between two separating walls 4 during all operations of the conveyor system. An important purpose of forming this closed surface is to prevent parts of the conveyed articles from becoming wedged between adjacent supporting members 6 or other parts of the conveyor system when the conveyor units 1 are running on curved track sections 3.

Figure 4:
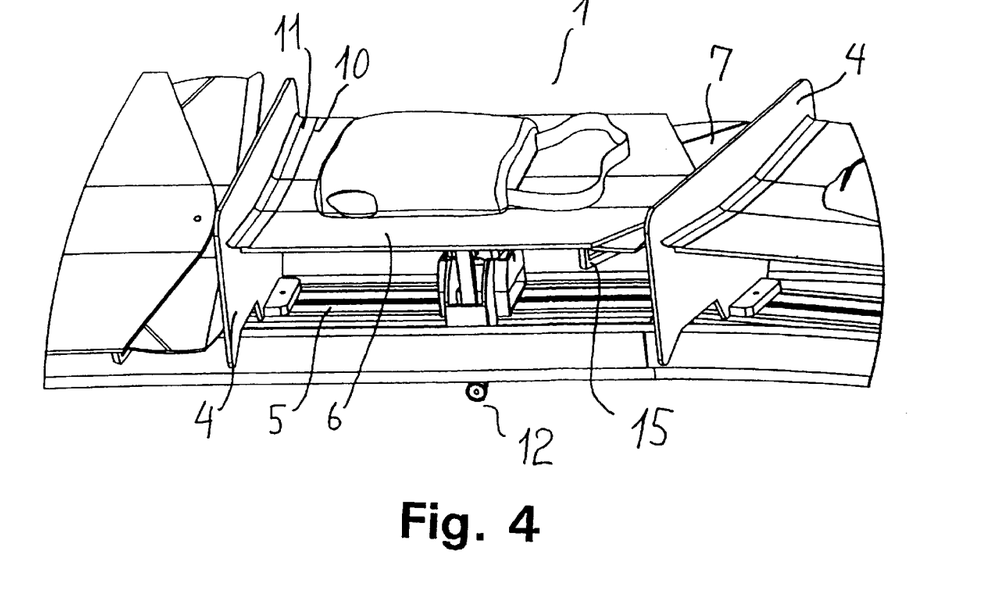
FIG. 4 shows details of the first end of a conveyor unit.

Details of the first end 10 of the article-supporting surface 6 are shown on FIG. 4. It clearly appears from the figure that the bent rim of the second covering sheet member 11 is resiliently engaging the separating wall member 4 mounted at the first end of the frame part 5 of the unit 1. The relative positions in the horizontal plane of the second covering sheet member 11 and the wall member 4 with which the sheet member 11 engages will not change during operation of the conveyor unit since the wall member 4 is mounted on the frame part 5 of the unit 1 and since the supporting surface 6 and the second covering sheet do not move in the horizontal plane relatively to the frame part 5.

Due to the size and shape of the wall member 4, substantial parts of the bent rim 9 of the first covering sheet member 7 and of the bent rim of the second covering sheet member 11 will engage the wall member 4 when the supporting surface 6 is tilted. Thereby, gaps that may be formed during tilting of the supporting surface 6 are minimized so as to prevent parts of the articles that are transported by the conveyor system from getting wedged when the article-supporting surface 6 is tilted or is returned from the tilted position to the supporting position.

Figure 5:
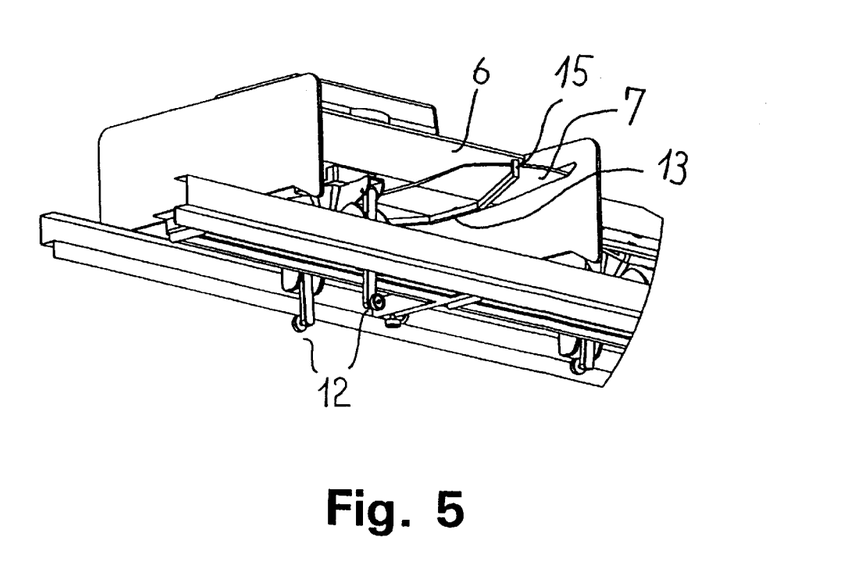
FIG. 5 shows the bracket member for supporting the first covering sheet.
Figure 6:
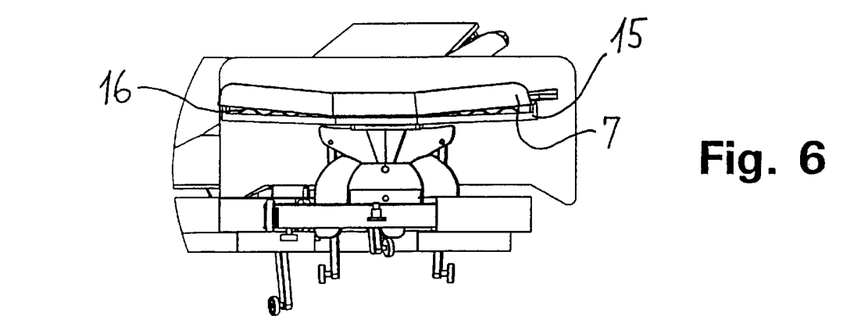
FIG. 6 shows a front view of the conveyor unit.

Preferably, the first covering sheet member 7 is supported on the lower side with a bracket member 15 mounted on the supporting surface 6 as shown on FIG. 5. The shown bracket member 15 is connected at the center to the pivot pin 13 and at each end to the supporting surface. The bracket member 15 may, as shown on FIG. 6, be equipped with resilient means 16 for resiliently biasing the first covering sheet member 7 upwards towards the article-supporting member 6 so as to prevent the formation of a gap between the second end 8 of the article-supporting surface 6 and the first covering sheet member 7. The resilient means 16 may be parts formed in a resilient material, such as, e.g., rubber, may comprise springs of various designs or any other means that fulfill the function of resiliently biasing the first covering means upwardly.

Figure 7:
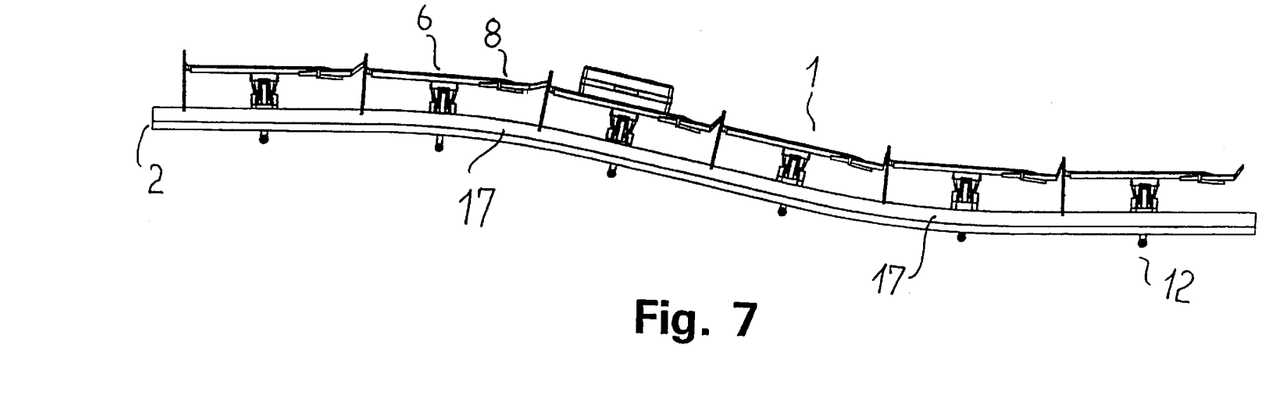
FIG. 7 shows a side view of the articulated conveyor passing track sections that are curved in the vertical plane.

In a preferred embodiment, the conveyor units 1 are interconnected in a manner that apart from enabling mutually pivotal movements between two adjacent units 1 in the horizontal plane also enables mutually pivotal movements in the vertical plane about a substantially horizontal axis, as illustrated on FIG. 7. Thereby, the conveyor system allows the tracks 2 to have sections 3 that are curved in the horizontal plane as well as to have sections 17 that are curved in the vertical plane. In a conveyor system according to this embodiment of the invention, the second end 8 of the article-supporting surface 6 and the second end of the frame part 5 are shaped so as to allow the necessary mutual pivotal movements between adjacent conveyor units 1 in both the horizontal and the vertical plane.

Figure 8:
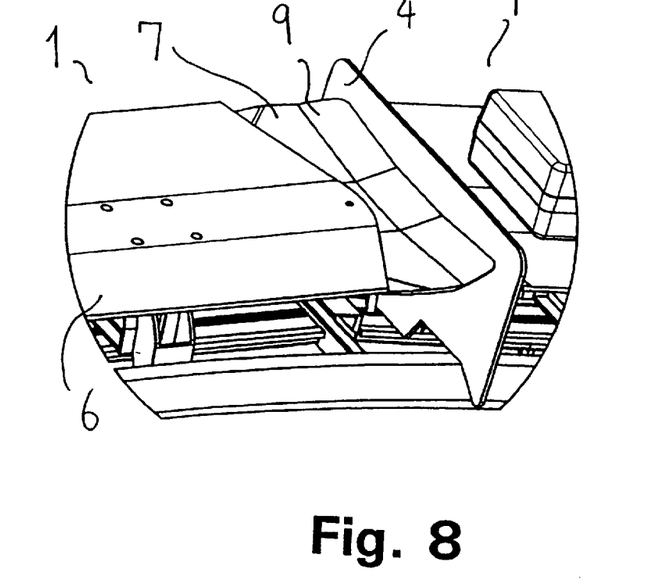
FIG. 8 shows details of the second end of a conveyor unit passing tracks that curves downwards.
Figure 9:
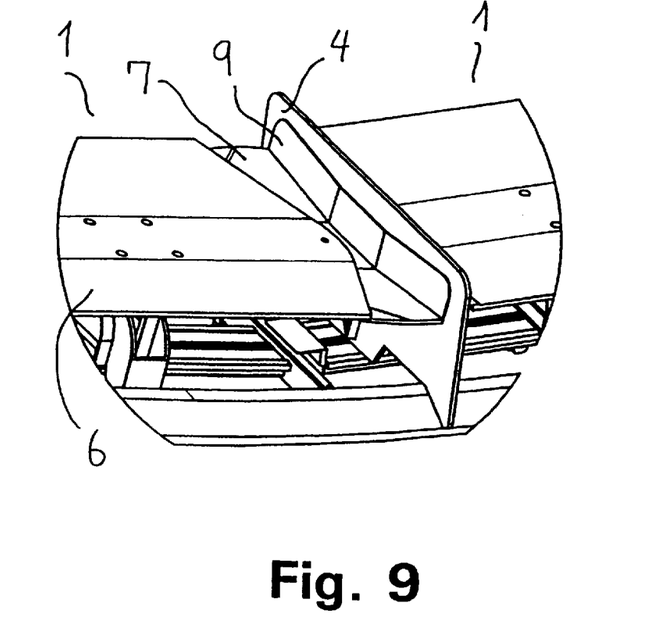
FIG. 9 shows details of the second end of a conveyor unit passing tracks that curves upwards.

Two operating conditions for the conveyor units 1 in the embodiment that allows track section 17 to be curved in the vertical plane are shown in FIGS. 8 and 9. The bent rim 9 of the first covering sheet member 7 is formed with a flexibility and resilient tension suitable for engaging the separating wall member 4 of the adjacent conveyor unit 1, both when the track section 17 curves downwards as shown in FIG. 8 and when the track section curves upwards as shown in FIG. 9. The rim 9 must be able to resiliently straighten out when the adjacent separating wall is moved away as shown in FIG. 8 and the rim must also be able to bent further when the separating wall member 4 moves closer on as shown in FIG. 9.

A second embodiment of an articulated conveyor according to the invention is shown in FIGS. 10–13. The first covering sheet member 7 is mounted at the second end of the article-supporting surface 6 similarly to the first embodiment, but the conveyor units 1 do not have a separating wall member 4. Instead, a slidable sheet member 18 extending beyond the first end 10 of the article-supporting member 6 in the direction towards the second end 8 of the article-supporting member 6 of the adjacent conveyor unit 1 is mounted at the first end part of the article-supporting member 6. The slidable sheet member 18 is mounted slidably in the longitudinal direction of the guide track 2 and is resiliently biased towards said adjacent conveyor unit 1.

The first covering sheet member 7 engages with the slidable sheet member 18 of the adjacent conveyor unit 1, so that the slidable sheet member 18 covers a possible gap between the first end 10 of the supporting member 6 and the first covering sheet member 7 of the adjacent conveyor unit 1 in all mutual pivotal positions of neighboring conveyor units 1 and guides the pivotal movement of the first covering sheet member 7.

The slidable sheet member 18 is enabled to slide forty millimeters in each direction relatively to the article-supporting surface 6 so as to allow for mutual pivotal movements in the vertical plane between adjacent conveyor units 1 without formation of gaps in which parts of the articles conveyed by the conveyor may become wedged or get stuck. Thus, the conveyor system allows the track 2 to have sections 3 that are curved in the horizontal plane, as well as to have sections 17 that are curved in the vertical plane.

Figure 10:
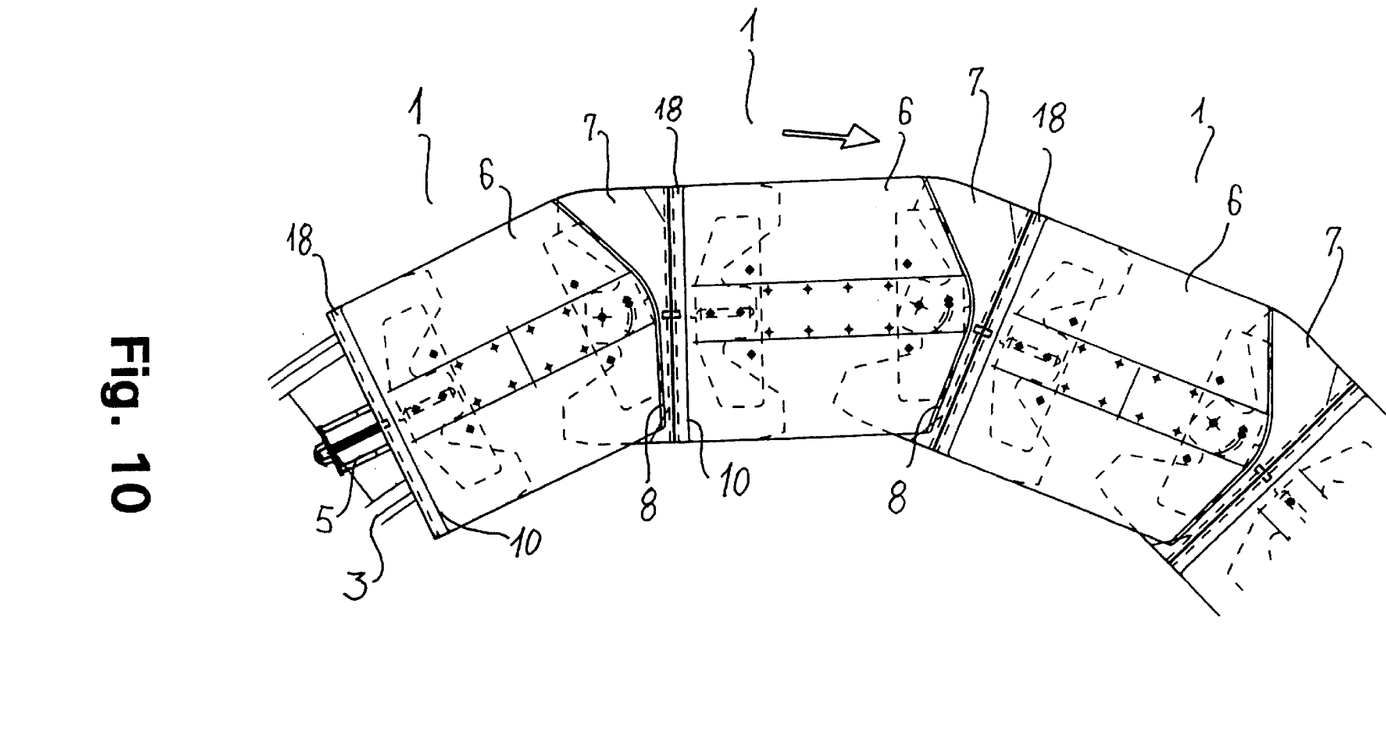
FIG. 10 shows a top view of a second embodiment of the articulated conveyor passing track sections that are curved in the horizontal plane.

FIG. 10 shows a top view of the second embodiment of the articulated conveyor passing track sections 3 that are curved in the horizontal plane. The pivotal movements of the first covering sheet members 7 to cover possible gaps between the article-supporting surfaces 6 and the slidable sheet members 18 of the adjacent conveyor unit 1 are guided by the abutting engagement between the first covering sheet members 7 and the slidable sheet members 18.

Figure 11:
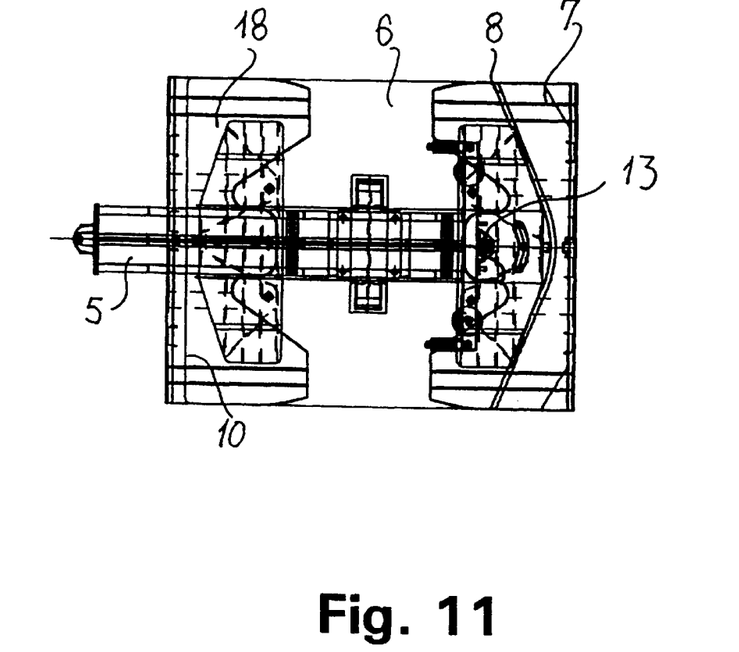
FIG. 11 shows a top view of a conveyor unit of the second embodiment.
Figure 12:
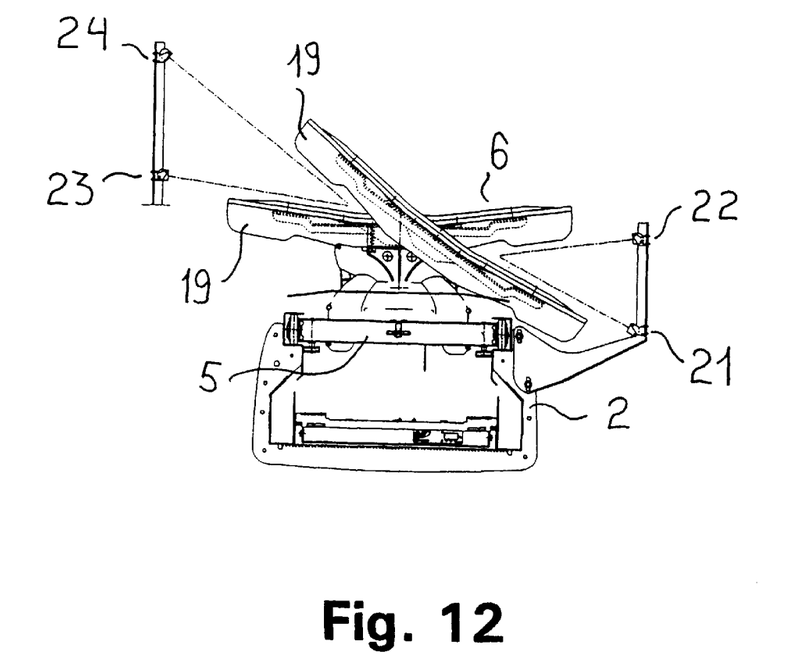
FIG. 12 shows a cross-sectional view of a conveyor unit of the second embodiment and a surveillance arrangement.
Figure 13:
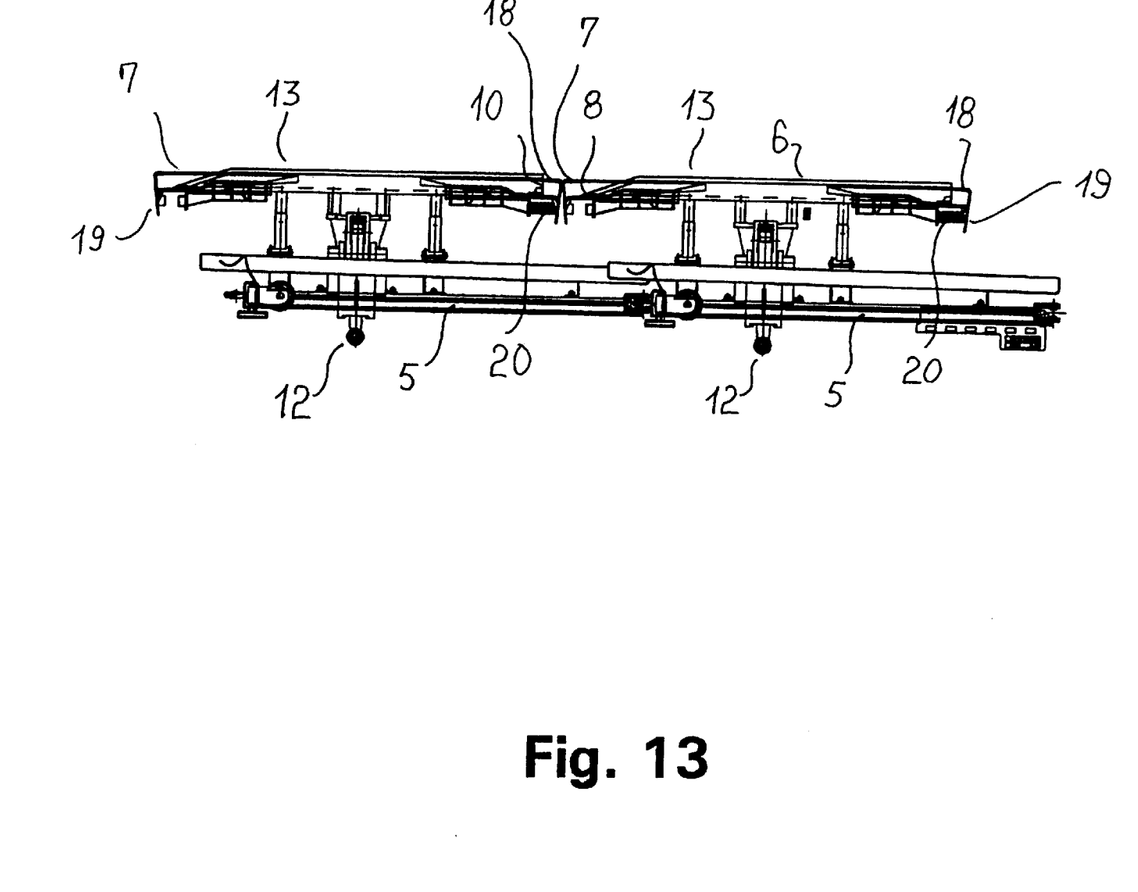
FIG. 13 shows a side view of a pair of conveyor units of the second embodiment.

FIG. 11 shows a top view of a single conveyor unit 1 of the second embodiment and FIG. 12 shows a cross-sectional view of a conveyor unit 1 of the second embodiment in which the article-supporting member 6 is shown in an article-supporting state as well as in a tilted state. FIG. 13 shows a side view of a pair of conveyor units 1 of the second embodiment.

The first covering sheet members 7 and the slidable sheet members 18 are at their mutually engaging ends equipped with screen parts 19 extending transversely to the longitudinal direction of the guide track 2 from said ends towards the guide track 2 so as to prevent parts of articles conveyed by the conveyor from being wedged during mutual tilting movements of article-supporting members 6 of adjacent conveyor units 1.

The slidable sheet member 18 is supported by the article-supporting member with a bracket member 15 similarly to the manner in which the first covering sheet member 7 is supported. The slidable sheet member is biased towards the first covering sheet member 7 of the adjacent conveyor unit 1 by a biasing member 20 shown in FIG. 13.

The second embodiment has the advantage over the first embodiment that the air resistance of the conveyor is lower, but the screens 19 do not provide as efficient a protection as the separating wall members 4 with respect to preventing parts of the articles conveyed by the conveyor from being wedged during mutual tilting movements of article-supporting members 6 of adjacent conveyor units 1. For that reason, a surveillance arrangement may be provided as illustrated in FIG. 12.

The purpose of the surveillance arrangement is to monitor the vertical gap between a screen part 19 of one conveyor unit 1 and an edge of a sheet member 7, 18 of an adjacent conveyor unit 1, wherein the article-supporting members 6 of the two conveyor units 1 are in different states, one in an article-supporting state and one in a tilted state. The surveillance arrangement may be placed between discharge stations and/or prior to a station for restoring tilted article-supporting members 6 to an article-supporting state and is connected to a control system that can bring the operation of the conveyor system to a halt in case a part of an article is about to be or is being wedged in one of the vertical gaps, so as to delimit the extent of damages to the conveyor system and to the conveyed articles.

The surveillance arrangement shown in FIG. 12 comprises four photo sensors 21–24 of which a pair 21–22, 23–24 is arranged on each side of the conveyor, monitoring the gaps on the respective sides. The photo sensor 21 has a line of detection being parallel to the article-support member 6 in its tilted state and may be used for monitoring whether an article is present on a tilted member 6.

The photo sensors 21–24 are of the type in which the background light intensity is subtracted from the detection so that the light source and the detector of a photo sensor may be placed together without having a reflector situated at the other end of the detection line. The presence of an object in the line of detection will cause a signal to be generated due to the detected change in light intensity. The distance between the photo sensors 21–24 and the sorter may depend on the set-up of the conveyor system and may be varied over a relatively large range.

The period of detection may be varied depending on the position of the arrangement along the conveyor. The period in which the gap can be monitored may be very short when the arrangement is positioned between two discharge stations in which the article on a tilted article-supporting member 6 may not have left the member 6 completely before the article-supporting member 6 of the following conveyor unit 1 may begin to tilt.

As an alternative to photo sensors 21–24, the surveillance arrangement may comprise one or more video cameras monitoring the vertical gaps.

What is claimed is:

1. An articulated conveyor for transporting articles and comprising a stationary guide track having curved track sections, a plurality of interconnected uniform conveyor units, which are mutually pivotally, connected, each conveyor unit including a frame part and an article-supporting member individually tiltably mounted on the frame part, each conveyor unit having opposite first and second ends, so that the first end of each conveyor unit is positioned adjacent to the second end of a neighboring unit, and having a transverse member which extends transversely to the longitudinal direction of the track and being mounted at the first end of the conveyor unit, the second end of each unit being shaped so as to allow for the necessary mutual pivotal movements when passing the curved track sections, a first covering sheet member being mounted at said second end of the supporting member and engaging with the transverse member at the first end of the adjacent conveyor unit so as to cover a possible gap between the second end of the supporting member and the adjacent transverse member in all mutual horizontal vertical pivotal positions of neighboring conveyor unit, the first covering sheet member being supported by supporting means mounted on said supporting member, and means for moving the interconnected conveyor units along said track.

2. A conveyor according to claim 1, wherein the curved track sections are curved in projection on a horizontal plane.

3. A conveyor according to claim 1, wherein the conveyor units are mutually interconnected pivotally about a substantially vertical pivot axis positioned at the second end of each supporting member.

4. A conveyor according to claim 1, wherein the curved track sections are curved in projection on a vertical plane.

5. A conveyor according to claim 1, wherein the conveyor units are mutually interconnected pivotally about a substantially horizontal axis.

6. A conveyor according to claim 2, wherein the first covering sheet member is pivotally connected to the second end of the supporting member about said substantially vertical pivot axis.

7. A conveyor according to claim 1, wherein the first covering sheet member is in abutting engagement with the lower side surface of the second end of the supporting member, supporting means mounted on the supporting member being in abutting engagement with the lower side surface of the first covering sheet member.

8. A conveyor according to claim 7, wherein the supporting means are resiliently biasing the first covering sheet member in an upward direction.

9. A conveyor according to claim 7, wherein a free end part of the supporting means is made from a resilient material and is pressed into engagement with the first covering sheet member by elastic forces.

10. A conveyor according to claim 1, wherein the supporting member is tiltable in relation to the frame part about an axis extending in the longitudinal direction of the guide track.

11. A conveyor according to claim 1, wherein the moving means are adapted to move the interconnected conveyor units along the guide track in such a direction that the second end of each conveyor unit is the leading end.

12. A conveyor according to claim 1, wherein the mutually engaging surface parts of the supporting member and the first covering sheet member, respectively, are coated with at least one of a friction reducing with wear resistant material.

13. A conveyor according to claim 1, wherein the transverse member comprises a separating wall member which extends transversely to the longitudinal direction of the track and is mounted at the first end of the frame member of each conveyor unit, the first covering sheet member engaging with the separating wall member of the adjacent conveyor unit.

14. A conveyor according to claim 13 and further comprising a second covering sheet member positioned at the first end of the supporting member and engaging with the adjacent separating wall member so as to cover a possible gap between the first end of the supporting member and the separating wall member.

15. A conveyor according to claim 13, wherein at least one of the first and second covering sheet member is at least partly made from flexible or resilient material.

16. A conveyor according to claim 15, wherein a bent free rim portion of the covering sheet member is resiliently engaging with the adjacent side surface of the separating wall member.

17. A conveyor according to claim 13, wherein at least the part of each separating wall member extending above the upper surface of the supporting member is made from a flexible material.

18. A conveyor according to claim 13, wherein each separating wall member comprises a zone having a reduced breaking strength so that the wall member breaks in this zone without causing substantial damage to other parts of the conveyor when the wall member is exposed to forces exceeding a predetermined safety limit.

19. A conveyor according to claim 13, wherein the mutually engaging surface parts of the covering sheet members and the separating wall members, respectively, are coated with at least one of a friction reducing and wear resistant material.

20. A conveyor according to claim 1, wherein the transverse member comprises a slidable sheet member extending beyond said first end in the direction towards the second end of the article-supporting member of the adjacent conveyor unit, the slidable sheet member being mounted slidably in the longitudinal direction of the guide track and being resiliently biased towards said adjacent conveyor unit, the first covering sheet member engaging with the slidable sheet member of the adjacent conveyor unit, so as to cover a possible gap between the first end of the supporting member and the first covering sheet member of said adjacent conveyor unit in all mutual pivotal positions of neighboring conveyor units.

21. A conveyor according to claim 20, wherein the first covering sheet member and the slidable sheet member at their mutually engaging ends are equipped with screen parts extending transversely to the longitudinal direction of the guide track from said ends towards the guide track so as to prevent parts of articles being conveyed by the conveyor from being wedged during mutual tilting movements of article-supporting members of adjacent conveyor units.

22. A conveyor according to claim 20, wherein the mutually engaging surface parts of the slidable sheet members and the article-supporting members, respectively, are coated with at least one of a friction reducing and wear resistant material.

23. The conveyor according to claim 1, wherein the first covering sheet member is in abutting engagement with a lower side surface of the second end of the supporting member.

24. The conveyor according to claim 1, wherein the supporting means mounted on the supporting member are in abutting engagement with the lower side surface of the first covering sheet member.

* * * * *